United States Patent
Zhang

(10) Patent No.: US 8,240,135 B2
(45) Date of Patent: Aug. 14, 2012

(54) EXHAUST SYSTEM MIXING DEVICE

(75) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 12/776,276

(22) Filed: May 7, 2010

(65) Prior Publication Data

US 2011/0131959 A1   Jun. 9, 2011

(51) Int. Cl.
*F01N 3/00* (2006.01)
(52) U.S. Cl. .............. 60/288; 60/285; 60/286; 60/287; 60/317; 60/324; 60/295; 366/338; 366/181.5
(58) Field of Classification Search ............ 60/317, 60/324, 286, 295, 285, 287, 288; 366/338, 366/181.5
See application file for complete search history.

(56) References Cited

U.S. PATENT DOCUMENTS

| | | | |
|---|---|---|---|
| 2,607,193 A | 8/1952 | Berggren et al. | |
| 3,811,278 A | 5/1974 | Taylor et al. | |
| 4,370,304 A | 1/1983 | Hendriks et al. | |
| 4,495,858 A * | 1/1985 | Erickson | 454/261 |
| 6,449,947 B1 * | 9/2002 | Liu et al. | 60/286 |
| 7,510,172 B2 * | 3/2009 | Kojima | 261/79.2 |
| 7,797,937 B2 * | 9/2010 | Endicott et al. | 60/605.1 |
| 2002/0108368 A1 | 8/2002 | Hodgson | |
| 2004/0237511 A1 | 12/2004 | Ripper et al. | |
| 2008/0250776 A1 * | 10/2008 | Brown et al. | 60/299 |
| 2010/0005790 A1 | 1/2010 | Zhang | |
| 2010/0107617 A1 * | 5/2010 | Kaiser et al. | 60/324 |
| 2011/0113764 A1 * | 5/2011 | Salanta et al. | 60/303 |

* cited by examiner

*Primary Examiner* — Kenneth Bomberg
*Assistant Examiner* — Matthew T Largi
(74) *Attorney, Agent, or Firm* — Julia Voutyras; Alleman Hall McCoy Russell & Tuttle LLP

(57) ABSTRACT

A mixing device comprises a circular disc of fin sections positioned so as to create openings in the inner and outer regions of the mixing device that generate oppositely rotating flows of exhaust gas. Each fin section may be identical, and may be created by a stamping process. The smooth surface of each fin section reduces creases, and thus, is less prone to urea buildup.

20 Claims, 4 Drawing Sheets

EXHAUST SYSTEM MIXING DEVICE

TECHNICAL FIELD

The present application relates to a mixing device for an exhaust system.

BACKGROUND AND SUMMARY

Many vehicles utilize catalysts in exhaust systems to reduce emission. In lean exhaust conditions, such as with regard to diesel exhaust or other lean burning conditions, catalyst may utilize reductant other than burnt fuel.

One such aftertreatment device is a Selective Catalytic Reduction (SCR) system which uses a catalyst to convert NOx to nitrogen and water. A urea-based SCR catalyst may use gaseous ammonia as the active NOx reducing agent, in which case an aqueous solution of urea may be carried on board of a vehicle, and an injection system may be used to supply it into the exhaust gas stream. Further, a mixing device (e.g., a flow mixer) may be utilized to increase flow mixing within the distance/packaging constraints of the exhaust passage.

In one mixing approach, namely U.S. Patent Application Publication No. 2008/0250776 (Brown, et al.), a mixing apparatus is provided which comprises a retainer ring having a first plurality and a second plurality of fins extending from the retainer ring which are operable to impart a rotational velocity component in a first direction and in a second direction opposite the first direction, respectively. The fins are formed integrally with the retainer ring by stamping a blank from sheet metal and bending to the desired shape. More specifically, the first plurality of fins are bent to an angle $\Theta$ (120-160 degrees) and the second plurality of fins are bent to an angle $\Phi$ (190-235 degrees).

The inventors of the present application have recognized a problem in such previous solutions. First, it may be difficult to manufacture such an apparatus since different fins must be bent at different angles in different directions. For example, as described above and shown in Brown's FIGS. 3-5, some fins are bent at obtuse angles whereas other adjacent fins are bent at reflex angles. Second, the creases where the fins are bent may be likely to collect urea. Such localized urea deposits may result in less of the urea being directed toward the catalyst, and thus reducing the effectiveness of the catalyst, and likewise, the SCR system.

Accordingly, in one example, some of the above issues may be addressed by an exhaust system for an engine, comprising an exhaust passage receiving engine exhaust gas and a mixing device arranged within the exhaust passage comprising a circular disc of fin sections. Each fin section has a straight edge and a curved edge, wherein the straight edge is positioned adjacent to a curved edge of a first neighboring fin section and the curved edge is positioned adjacent to a straight edge of a second neighboring fin section.

In this way, by linking one fin section via its straight edge to another fin section via its curved edge, it is possible to create openings in the inner and outer regions of the mixing device that generate oppositely rotating flows of exhaust gas. As such, the mixing device enhances flow mixing downstream of the mixing device, while operating within the packaging constraints typical of an exhaust passage. Further, since each fin section may be identical, the fin sections may be easily manufactured, for example, via a stamping process. Thus, the fins may be manufactured at a low cost while still providing a robust mixing device. Moreover, the smooth surface of each fin section is free from creases, and thus, is not prone to urea buildup.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments of an exhaust system mixing device are disclosed herein. Such a mixing device may be utilized for creating two counter-rotated bulk flows forming a turbulent flow to enhance flow mixing, as described in more detail hereafter.

Figure 1:
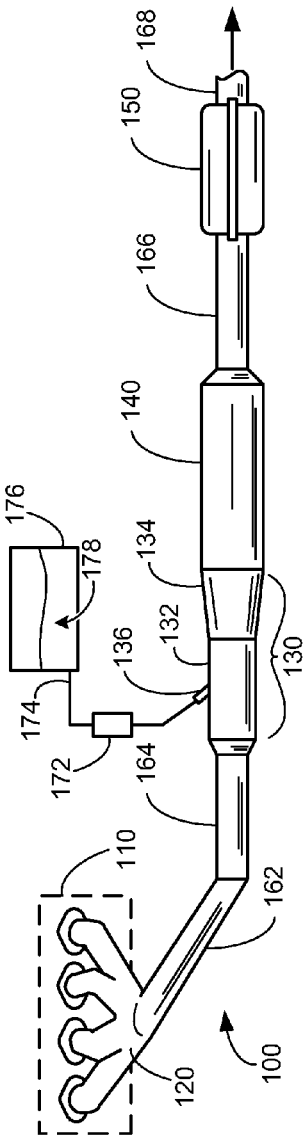
FIG. 1 illustrates an exhaust system for receiving engine exhaust gas.

FIG. 1 illustrates an exhaust system 100 for transporting exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others.

Exhaust system 100 may include one or more of the following: an exhaust manifold 120 for receiving exhaust gases produced by one or more cylinders of engine 110, a mixing region 130 arranged downstream of exhaust manifold 120 for receiving a liquid reductant, a selective catalytic reductant (SCR) catalyst 140 arranged downstream of the mixing region 130, and a noise suppression device 150 arranged downstream of catalyst 140. Additionally, exhaust system 100 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. Catalyst 140 may be fluidically coupled to noise suppression device 150 by exhaust passage 166. Finally, exhaust gases may be permitted to flow from noise suppression device 150 to the surrounding environment via exhaust passage 168. Note that while not illustrated by FIG. 1, exhaust system 100 may include a particulate filter and/or diesel oxidation catalyst arranged upstream or downstream of catalyst 140. Furthermore, it should be appreciated that exhaust system 100 may include two or more catalysts.

In some embodiments, mixing region 130 can include a greater cross-sectional area or flow area than upstream exhaust passage 164. Mixing region 130 may include a first portion 132 and a second portion 134. The first portion 132 of mixing region 130 may include an injector 136 for selectively injecting a liquid into the exhaust system. As one non-limiting example, the liquid injected by injector 136 may include a liquid reductant 178 such as ammonia or urea. The liquid reductant 178 may be supplied to injector 136 through conduit 174 from a storage tank 176 via an intermediate pump 172. The second portion 134 of mixing region 130 may be configured to accommodate a change in cross-sectional area or flow area between the first portion 132 and the catalyst 140. Note that catalyst 140 can include any suitable catalyst for reducing NOx or other products of combustion resulting from the combustion of fuel by engine 110.

Note that with regards to vehicle applications, exhaust system 100 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIG. 1 and/or may omit components described herein.

Figure 2:
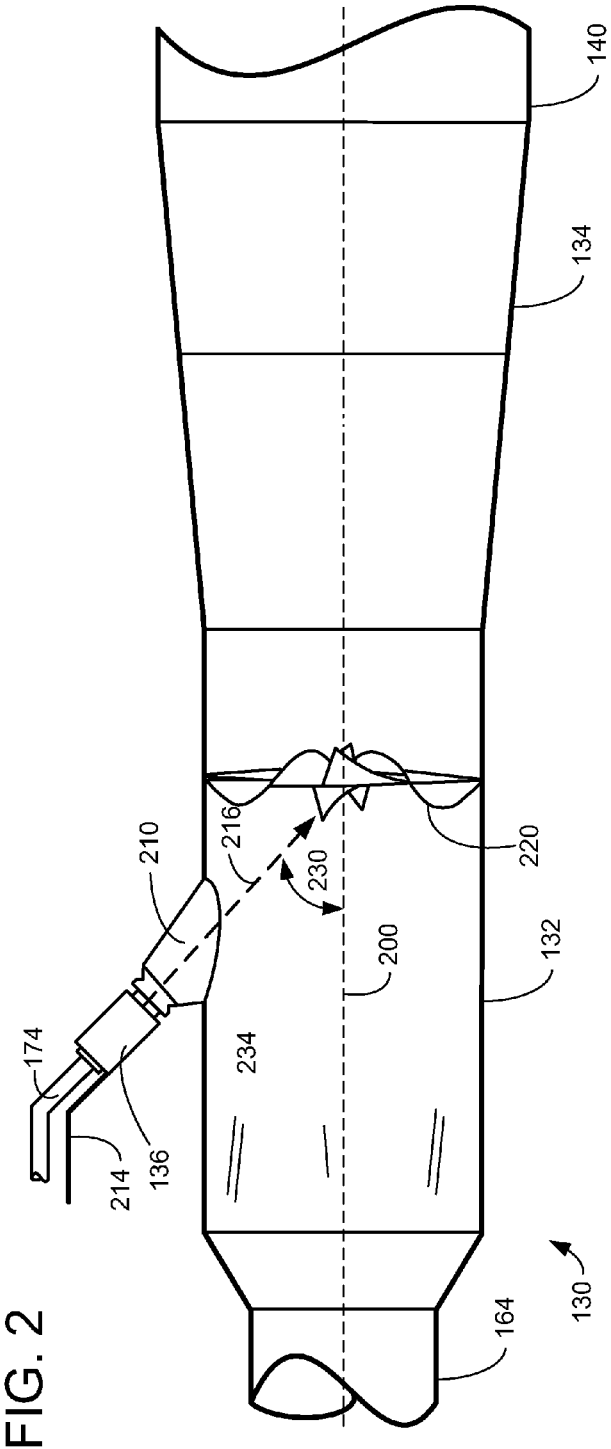
FIG. 2 illustrates a side view of the exhaust system of FIG. 1 in greater detail as a longitudinal cross-section.

FIG. 2 illustrates a side view of mixing region 130 in greater detail as a longitudinal cross-section. A center longitudinal axis of mixing region 130 is indicated at 200. Injector 136 is shown coupled to a wall of the first portion 132 of mixing region 130 by an injector boss 210. In this example, injector 136 is external to the flow area of the exhaust passage. In this way, the injector may be protected from thermal degradation, which may be caused by high temperature exhaust gases. Further, as the injector may be recessed beyond the wall of the exhaust passage via the injector boss, interruption of the exhaust flow by the injector may be reduced. Injector 136 can inject, through an opening in the wall of the mixing region, a liquid supplied to it by conduit 174 in response to a control signal received via communication line 214 from an electronic control system of engine 110. The liquid may be supplied to injector 136 through conduit 174 from a storage tank 176 via an intermediate pump 172. Note that the pump 172 may also be controlled by an electronic control system of engine 110 to provide suitably pressurized reductant to injector 136.

Injector 136 can be oriented to inject the reductant toward a mixing device 220 along an injection axis 216 as a spray. As one non-limiting example, mixing device 220 may be configured as a circular disc of fin sections. A non-limiting example of mixing device 220 is described in greater detail with reference to FIGS. 3-5. In some embodiments, injection axis 216 can be coincident with a center of the spray pattern provided by injector 136. The spray pattern provided by injector 136 may include any suitable pattern for improving the mixing and evaporation rate of the reductant with the exhaust gases. For example, an injector can provide sprays that form sheets, filled cones, hollow cones, multiple cones, etc.

Injection axis 216 can be directed at a particular region of mixing device 220. As one non-limiting example, injection axis 216 can intersect the center of mixing device 220, which may also be coincident with longitudinal axis 200. In this example, injector boss 210 is configured to couple injector 136 to the wall of the exhaust system so that injection axis 216 is angled relative to longitudinal axis 200 at an angle indicated by 230. As one non-limiting example, angle 230 may be an angle of approximately 45 degrees. As another example, angle 230 may be an angle between 20 degrees and 55 degrees. For example, angle 230 may be approximately 30 degrees. However, it should be appreciated that other suitable angles may be utilized. By mounting the injector at an angle, direct impingement of injection spray on the inner wall can be reduced, and thus durability issues due to erosion may be reduced.

Note that the angles described herein may be with reference to a particular flow condition. For example, the angle of injection axis 216 as described above may be measured with reference to a condition where there is no exhaust flow. As the flow of exhaust gases increase, the spray pattern provided by the injector may change as the liquid reductant is entrained by the exhaust gases.

Mixing device 220 may be arranged within the exhaust passage (e.g., downstream of injector 136) and may be configured to receive engine exhaust gas upstream of the mixing device 220 and direct the engine exhaust gas downstream. Mixing device 220 comprises a circular disc of fin sections. Each fin section has a straight edge and a curved edge, as described in more detail hereafter.

The fins are positioned so as to create openings through which the engine exhaust gas can flow. More specifically, the straight edge of each fin section is positioned adjacent to a curved edge of neighboring fin section, and accordingly, the curved edge of each fin section is positioned adjacent to a straight edge of another neighboring fin section. It is this intersection of a straight edge and a curved edge which creates the openings through which the exhaust gas can flow.

Figure 3:
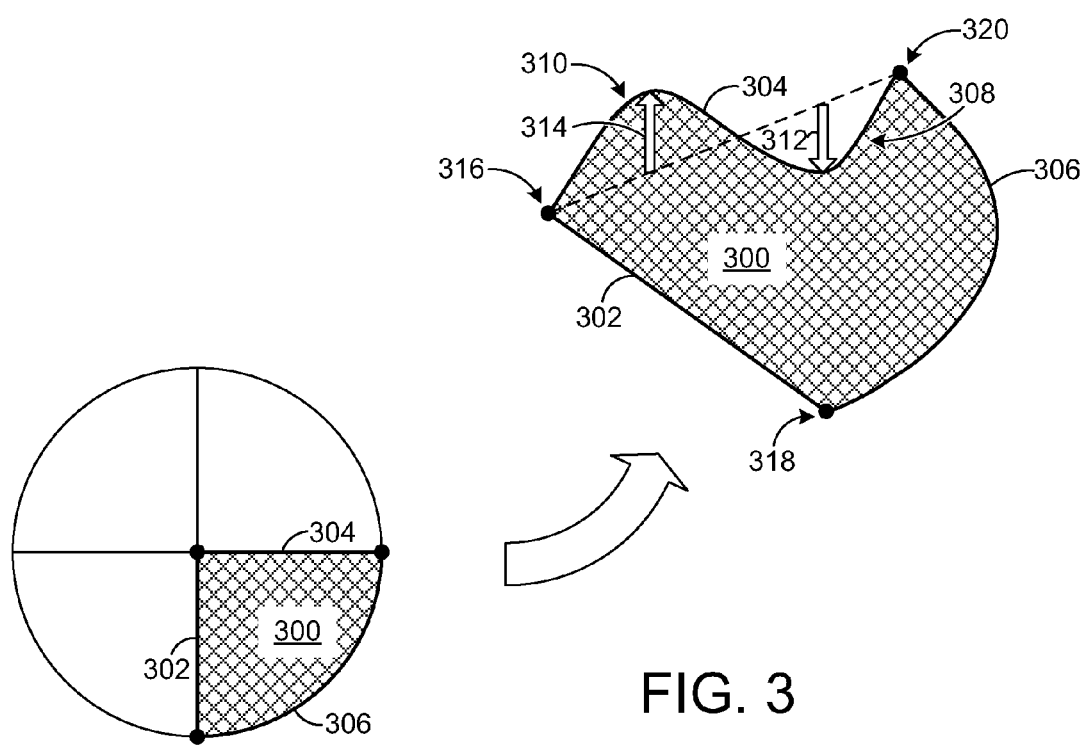
FIG. 3 illustrates an example fin section of an embodiment of a mixing device.

FIG. 3 shows an example fin section 300. It can be appreciated that the fin sections of mixing device 220 may be identical, such that example fin section 300 may be any of the fin sections of mixing device 220. In the depicted example, each fin section has substantially a circle-quadrant form factor, and thus mixing device 220 may comprise four fin sections as described in more detail with reference to FIG. 4. Continuing with FIG. 3, fin section 300 has two radial edges, namely radial edge 302 and radial edge 304, and an outer circumferential edge 306. Radial edge 302 is configured as a straight edge, whereas radial edge 304 is deformed so as to have a curved edge. In other words, radial edge 302 defines a straight edge of fin section 300 and radial edge 304 defines a curved edge of fin section 300. As such, fin section 300 has a smooth surface, and has a continuous curvature from edge 302 to 304, without creases, hard angles, etc. In one example, the section may be stamped from a flat sheet of metal over a die of the appropriate matching desired curvature, and thus may be easily manufactured, for example, via a stamping process. Further, since the surface of each fin section is free from creases, it is thus less prone to urea buildup than other configurations having creases where two angle planes with respect to each other intersect forming a crease line.

The curved edge of the section 300 may be configured in various suitable ways. In the depicted example of FIG. 3, radial edge 304 may deformed to have a trough 308 and a crest 310, wherein trough 308 is positioned radially outward from crest 310 (e.g., radially outward from a center of the mixing device). In some embodiments, the trough 308 and crest 310 may be of equal and opposite magnitudes, as indicated by magnitude arrows 312 and 314. It can be appreciated that this is just one example of a possible deformation creating the curved edge of a fin section, and that the curved edge may instead be deformed in another way without departing from the scope of this disclosure.

As depicted in FIG. 3, fin section 300 has a smooth surface of continuous curvature, including a hill region of the surface near crest 310 and a valley region of the surface near trough 308. An absolute magnitude of the surface curvature decreases from radial edge 304 to radial edge 302, such that the surface is substantially flat in a region near edge 302. Likewise, the absolute magnitude of the surface curvature also decreases from radial edge 304 to circumferential edge 306, such that the surface is substantially flat in a region near edge 306. Further, the curvature of the surface of a fin section may be utilized to control the intensities of the two counter-rotated bulk flows generated by mixing device 220.

Figure 5:
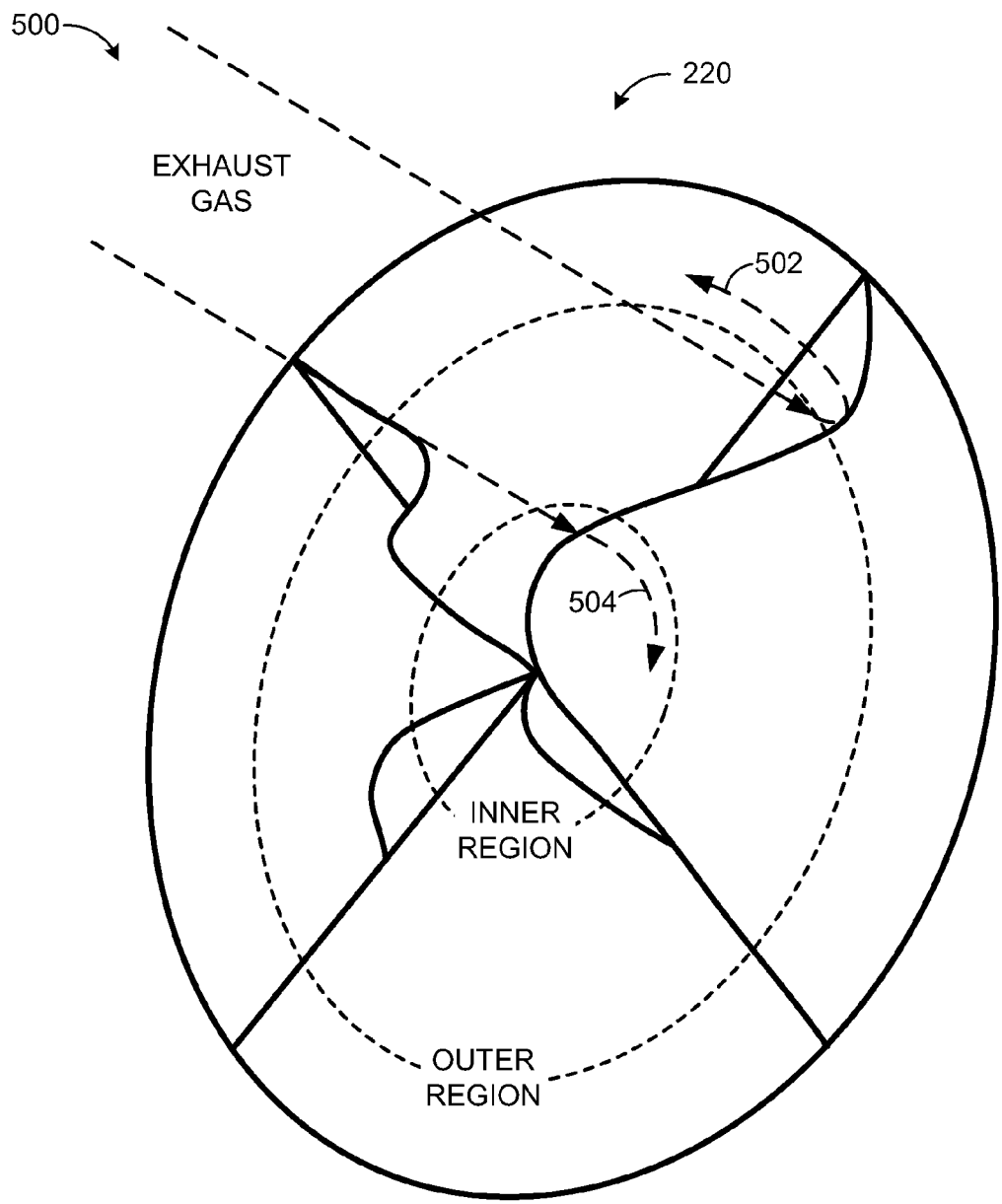
FIG. 5 illustrates an embodiment of a mixing device generating two counter-rotated bulk flows.

As such, each intersection of a straight edge and a curved edge of neighboring fin sections creates a first opening (e.g., including a trough) protruding in a flow direction and a second opening (e.g., including a crest) protruding in a direction opposite to the flow direction, as described in more detail hereafter with reference to FIG. 5. These openings not only allow for mixing device 220 to receive the engine exhaust gas upstream of the mixing device and to direct the engine exhaust gas downstream of the mixing device, but they also allow mixing device to create two counter-rotated flows, as described in more detail hereafter.

The fin sections may be connected (e.g., welded) to each other at a center of the mixing device 220. More specifically, each fin section may be connected to one another at a vertex 316 of radial edge 302 and radial edge 304. Each fin section may be further connected (e.g., welded) to neighboring fin sections at endpoints of the circumferential edge 306, namely at vertices 318 and 320. As such, each intersection of a straight edge and a curved edge of neighboring fin sections is substantially at two endpoints of a radial edge of each fin section. For example, an intersection including radial edge 302 may be substantially at vertex 316 and vertex 318. As another example, an intersection including radial edge 304 may be substantially at vertex 316 and vertex 320. In this way, the intersection may be defined by the thicknesses of neighboring fin sections coupled at the intersection. It can be appreciated that this is just one example of connecting the fin sections of the mixing device, and that the fin sections may additionally or alternatively be connected in other ways without departing from the scope of this disclosure.

Figure 4:
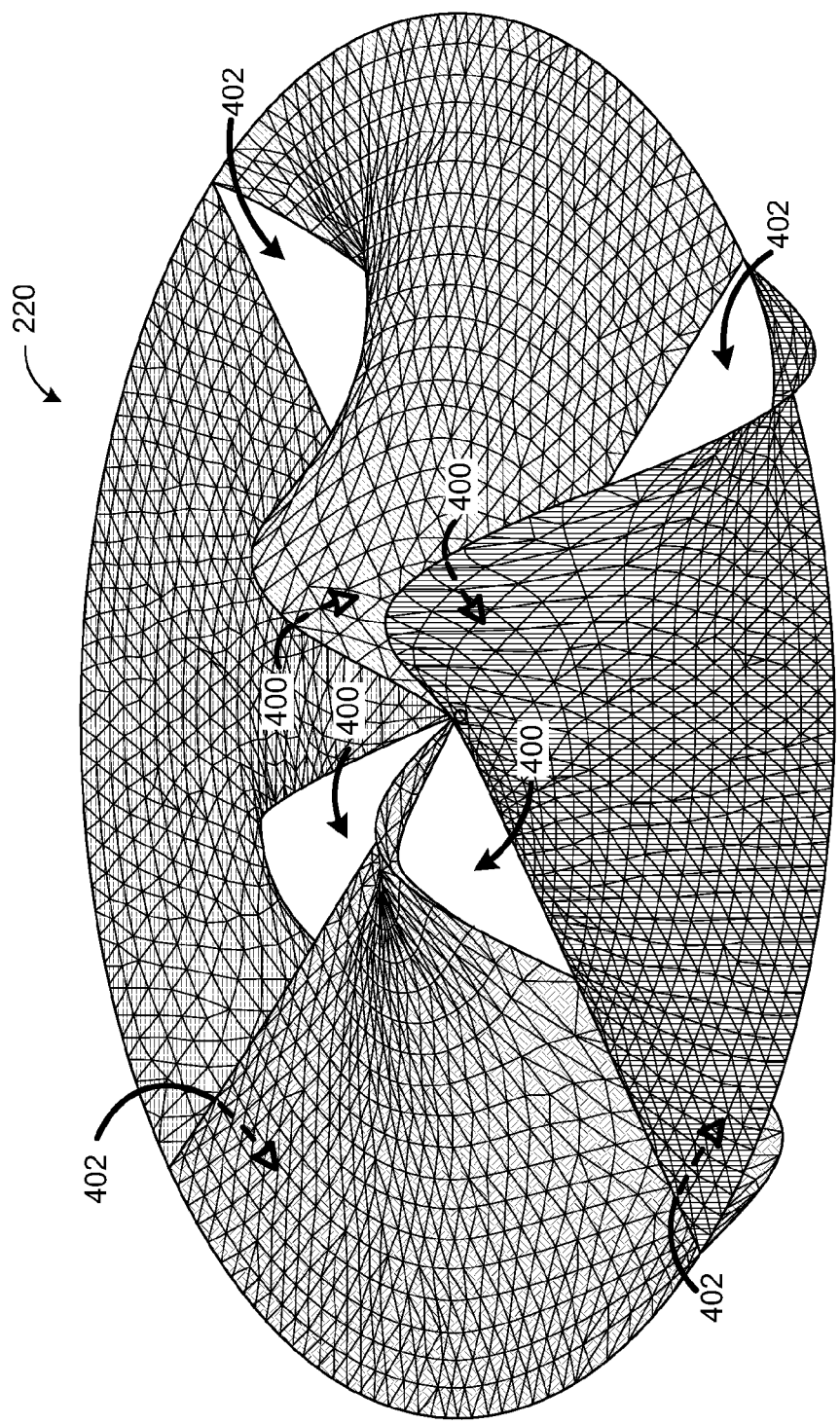
FIG. 4 illustrates an embodiment of a mixing device of an exhaust system drawn approximately to scale.

In this way, by linking one fin section via its straight edge to another fin section via its curved edge, it is possible to create openings in the inner and outer regions of the mixing device. FIG. 4 shows mixing device 220 comprising fins configured as described above, creating openings 400 in an inner region of mixing device 220 and openings 402 in an outer region of mixing device 220, wherein the outer region is radially outward from the inner region with respect to a radial direction from the center of mixing device 220.

In other words, each intersection of a straight edge and a curved edge of neighboring fin sections comprises a first opening created by the first portion (e.g., a trough) of the curved edge and a second opening created by the second portion (e.g., a crest) of the curved edge. Since the troughs of the fin sections are positioned radially outward from the crests of the fin sections, the first opening of each intersection protrudes in a flow direction and the second opening of each intersection protrudes in a direction opposite to the flow direction. Therefore, the openings at each intersection are configured to direct the engine exhaust gas in opposite rotational directions, described in more detail as follows.

Note that the surface lines (forming triangles) and surface shading of FIG. 4 are for illustrative purposes to represent the 3-D shape of the fins so that the 3-D shape can be more easily visualized. These lines and shading are not actually part of the component.

FIG. 5 illustrates the two counter-rotated bulk flows created by mixing device 220. In the depicted example, exhaust gas enters mixing device 220 from an upstream side of mixing device 220, as shown at 500. The first opening of each intersection is configured to receive the engine exhaust gas (e.g., via a trough of a fin) and direct the engine exhaust gas in a first rotational direction (e.g., counter-clockwise), as indicated at 502. Further, the second opening of each intersection is configured to receive the engine exhaust gas (e.g., via a crest of a fin) and direct the engine exhaust gas in a second rotational direction (e.g., clockwise) that is opposite to the first rotation direction, as indicated at 504. As such, two counter-rotated bulk flows are generated by mixing device 220. The two counter-rotated bulk flows then interact with each other to generate a turbulent flow, thus enhancing mixing. Further, the individual and relative intensities of the two bulk flows can be adjusted by the curve design of the curved radial edge of the fin. In other words, the curved edge of each fin section defines the intensity of the flow of engine exhaust gas in the first rotational direction, as well as the intensity of the flow of engine exhaust gas in the second rotational direction.

FIG. 5 illustrates one possible configuration of mixing device 220, wherein the troughs of the fin sections protrude in a flow direction of the exhaust gas and the crests of the fin sections protrude in a direction opposite to the flow direction. However, it should be appreciated that such a configuration is nonlimiting, and that mixing device 220 may instead be positioned in other configurations. For example, mixing device 220 may be positioned in an inverted configuration, such that the crests protrude in a flow direction and the troughs protrude in a direction opposite to the flow direction. Such a configuration still generates the two counter-rotated bulk flows as described herein, which interact with each other to generate a turbulent flow and thus enhance mixing.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An engine exhaust system, comprising:
   an exhaust passage; and
   a mixing device within the exhaust passage comprising a circular disc of fins, each fin having a radial straight edge and a radial curved edge, the straight edge positioned adjacent to a curved edge of a first neighboring fin at each of two intersecting endpoints, the curved edge positioned adjacent to a straight edge of a second neighboring fin at each of two intersecting endpoints.

2. The exhaust system of claim 1, wherein an intersection of a straight edge and a curved edge of neighboring fins creates a first opening protruding in a flow direction and a second opening protruding in a direction opposite to the flow direction, the exhaust passage receiving engine exhaust gas.

3. The exhaust system of claim 2, wherein the first opening of each intersection is configured to receive the engine exhaust gas and direct the engine exhaust gas in a first rotational direction and the second opening of each intersection is configured to receive the engine exhaust gas and direct the engine exhaust gas in a second rotational direction opposite to the first rotational direction.

4. The exhaust system of claim 1, wherein, for each fin, a first portion of the curved edge protrudes in a flow direction and a second portion of the curved edge protrudes in a direction opposite to the flow direction.

5. The exhaust system of claim 4, wherein an intersection of a straight edge and a curved edge of neighboring fins comprises a first opening created by the first portion of the curved edge and a second opening created by the second portion of the curved edge.

6. The exhaust system of claim 5, wherein, for each intersection, the first opening is created radially outward from the second opening.

7. The exhaust system of claim 6, wherein the first opening of each intersection is configured to receive engine exhaust gas and direct the engine exhaust gas in a first rotational direction and the second opening of each intersection is configured to receive the engine exhaust gas and direct the engine exhaust gas in a second rotational direction opposite to the first rotational direction.

8. The exhaust system of claim 1, wherein the circular disc of fins is a circular disc of four fins, each fin having a substantially circle-quadrant form factor with a first radial edge defining the straight edge of the fin and a second radial edge deformed to have a trough and a crest defining the curved edge of the fin.

9. The exhaust system of claim 1, wherein the mixing device is configured to receive engine exhaust gas and to generate two counter-rotated bulk flows of the engine exhaust gas, and wherein the curved edge of each fin defines an individual intensity of each of the two counter-rotated bulk flows and a relative intensity of the two counter-rotated bulk flows.

10. An exhaust system for an engine, comprising:
    an exhaust passage receiving engine exhaust gas; and
    a mixing device arranged within the exhaust passage comprising a circular disc of fin sections, each fin section having a substantially circle-quadrant form factor with a smooth surface and two radial edges including, a straight radial edge and a deformed curved radial edge, the straight radial edge positioned adjacent to a deformed curved radial edge of a first neighboring fin section and the deformed curved radial edge positioned adjacent to a straight radial edge of a second neighboring fin section to define an intersection creating a first opening configured to receive the engine exhaust gas and direct the engine exhaust gas in a first rotational direction and a second opening configured to receive the engine exhaust gas and direct the engine exhaust gas in a second rotational direction opposite to the first rotational direction, the deformed curved radial edge of each fin section comprising a trough and a crest of equal and opposite magnitude.

11. The exhaust system of claim 10, wherein, for each intersection, the first opening protrudes in a flow direction and the second opening protrudes in a direction opposite to the flow direction.

12. The exhaust system of claim 10, wherein, for each intersection, the first opening is created radially outward from the second opening.

13. The exhaust system of claim 10, wherein each fin section further comprises a circumferential edge, and wherein each fin section is welded to neighboring fin sections at endpoints of the circumferential edge, and wherein the fin sections are welded to each other at a center of the circular disc.

14. The exhaust system of claim 10, wherein the deformed curved radial edge of each fin defines an intensity of a flow of the engine exhaust gas in the first rotational direction and an intensity of a flow of the engine exhaust gas in the second rotational direction.

15. The exhaust system of claim 10, wherein the mixing device comprises four fin sections.

16. An exhaust system for an engine, comprising:
    an exhaust passage for receiving engine exhaust gas;
    an injector coupled to a wall of the exhaust passage and configured to inject a liquid into the exhaust passage, the injector including an injection axis that is angled relative to a longitudinal axis of a mixing region of the exhaust passage; and
    a mixing device arranged within the exhaust passage downstream of the injector within the mixing region, the mixing device comprising a circular disc comprising four circle-quadrant fins, each circle-quadrant fin having a first radial edge, a second radial edge, and an outer circumferential edge, the first radial edge being straight and the second radial edge being deformed to have a crest and a trough, each circle-quadrant fin being connected to a center point of the circular disc and being connected at vertices of the outer circumferential edge to neighboring circle-quadrant fins, and each circle-quadrant fin being positioned such that the first radial edge of the circle-quadrant fin is positioned adjacent to a second radial edge of a neighboring circle-quadrant fin.

17. The exhaust system of claim 16, wherein each intersection of a first radial edge of a circle-quadrant fin and a trough of a second radial edge of a neighboring circle-quadrant fin defines a first opening configured to receive the engine exhaust gas and direct the engine exhaust gas in a first rotational direction, wherein each intersection of a first radial edge of a circle-quadrant fin and a crest of a second radial edge of a neighboring circle-quadrant fin defines a second opening configured to receive the engine exhaust gas and direct the engine exhaust gas in a second rotational direction opposite to the first rotational direction, wherein each intersection is defined at welding points coupling neighboring circle-quadrant fins together at vertices of the first radial edge and the second radial edge, and wherein a surface of each fin section is a continuous surface free from linear creases.

18. The exhaust system of claim 17, wherein, for each intersection, the trough protrudes in a flow direction and the crest protrudes in a direction opposite to the flow direction.

19. The exhaust system of claim 18, wherein, for each intersection, the trough is positioned radially outward from the crest.

20. The exhaust system of claim 1, wherein each adjacent curved and straight edge of adjacent fins form troughs and crests with oppositely facing openings.

* * * * *